July 11, 1939.  G. H. AKLIN ET AL  2,165,328

LENS

Filed April 16, 1938

FIG. 1.

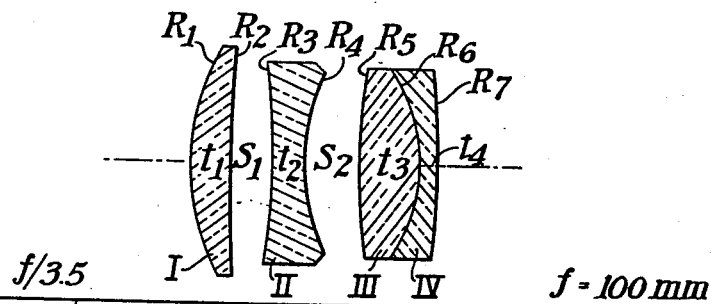

f/3.5      f = 100 mm

| LENS | GLASS | | RADII | | SPACINGS | |
|---|---|---|---|---|---|---|
| I | $N_D$ | 1.620 | $R_1$ | =+ 30.0 mm | $t_1$ | = 5.00 mm |
|   | $\nu$ | 60.4 | $R_2$ | =+386.0 " | $S_1$ | = 5.52 " |
| II | $N_D$ | 1.575 | $R_3$ | =− 77.7 " | $t_2$ | = 3.72 " |
|   | $\nu$ | 41.4 | $R_4$ | =+ 25.9 " |   |   |
| III | $N_D$ | 1.637 | $R_5$ | =+ 81.2 " | $S_2$ | = 6.88 " |
|   | $\nu$ | 56.1 | $R_6$ | =− 20.9 " | $t_3$ | = 7.99 " |
| IV | $N_D$ | 1.523 | $R_7$ | =−113.7 " | $t_4$ | = 2.00 " |
|   | $\nu$ | 50.5 |   |   |   |   |

FIG. 2.

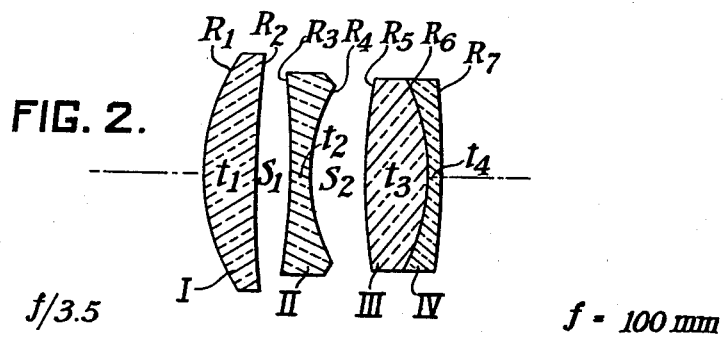

f/3.5      f = 100 mm

| LENS | GLASS | | RADII | | SPACINGS | |
|---|---|---|---|---|---|---|
| I | $N_D$ | 1.620 | $R_1$ | =+ 27.5 mm | $t_1$ | = 6.63 mm |
|   | $\nu$ | 60.4 | $R_2$ | =+165.0 " | $S_1$ | = 4.45 " |
| II | $N_D$ | 1.605 | $R_3$ | =−117.0 " | $t_2$ | = 2.48 " |
|   | $\nu$ | 38.2 | $R_4$ | =+ 24.9 " |   |   |
| III | $N_D$ | 1.639 | $R_5$ | =+ 73.5 " | $S_2$ | = 6.86 " |
|   | $\nu$ | 55.5 | $R_6$ | =− 27.2 " | $t_3$ | = 7.96 " |
| IV | $N_D$ | 1.523 | $R_7$ | =−120.1 " | $t_4$ | = 2.00 " |
|   | $\nu$ | 58.4 |   |   |   |   |

Fred E. Altman
George H. Aklin
INVENTORS

BY Newton M. Perrins
Rolla N. Carter
ATTORNEYS

Patented July 11, 1939

2,165,328

UNITED STATES PATENT OFFICE 2,165,328

LENS

George H. Aklin and Fred E. Altman, Rochester, N. Y., assignors to Eastman Kodak Company, Rochester, N. Y., a corporation of New Jersey Application April 16, 1938, Serial No. 202,485

5 Claims. (Cl. 88—57)

This invention relates to optical systems and particularly to highly corrected photographic objectives.

It relates specifically to that type of objective having two collective components spaced on opposite sides of a dispersive component, the rear collective component being compound. This type of objective is more completely defined by stating (1) that the front collective component has a relatively strong front surface convex to the incident with a radius of curvature about ¼F where F is the focal length of the objective and has a relatively weak rear surface with a radius of curvature usually greater than F and usually negative (i. e. concave to the incident light) and (2) that the dispersive component is biconcave with its rear surface the stronger having a radius of curvature about ¼F and its front surface having a radius of curvature usually between −½F and −F. It is possible to make either or both of these components compound to gain slight improvements without making any radical changes in the properties of the objective and hence without departing from this type of objective as above defined. However, these two components are usually simple and it is in the simple case that the present invention is most useful.

The invention is concerned primarily with the rear compound component and with the spacing of the components. It has for one of its objects the providing of a high aperture objective with wide covering power and more highly corrected for spherical aberration than hitherto. Another object is to provide better correction for astigmatism over at least substantially as wide a field as hitherto.

According to the invention, the rear air space (i. e. that between the dispersive component and the rear collective component) is less than twice the front air space and is preferably but not necessarily greater than this front air space. Furthermore, the rear collective component is arranged with its crown element to the front and its cemented surface concave to the incident light. The front surface of this rear element is made relatively strong and for ordinary glasses has a radius of curvature less than F. Of course if an extremely high index glass is used in this element, say $N_D = 1.8$, this radius may be as large as 1.5F, but for $N_D$ less than 1.65, the rule that it should be less than F holds. The rear surface of this rear component is made weak having preferably a radius of curvature whose absolute value is greater than F. This radius may be slightly less than F without departing from the invention provided the front surface of the component is proportionally strengthened so that the balance of power between the elements of this component and between the three components is not appreciably disturbed.

In certain preferred embodiments of the invention involving the above features, there are certain additional features relating to the front components. In these embodiments, the front collective component is made meniscus and/or the dispersive component has a front surface whose radius of curvature is slightly greater than F.

An objective made according to this invention has generally improved characteristics over other lenses working at the same relative aperture. In the examples shown in the accompanying drawing, there is a high degree of correction for astigmatism. If the usual rules of weakening the individual components throughout to give wider covering power, is applied slightly, the present invention holds the astigmatism within tolerance limits and hence may be considered as supplying either improved astigmatism or wider covering power without loss in correction for astigmatism. Furthermore, the invention provides better control over and hence better correction for spherical aberration than in similar objectives.

Fig. 1 and Fig. 2 show two slightly different embodiments of the invention.

The specifications of the lenses shown are as follows:

Fig. 1   f/3.5   F=100 mm.

| Lens | Glass | Radii | Spacings |
|------|-------|-------|----------|
|      |       | mm.   | mm.      |
| I    | $N_D=1.620$<br>$V=60.4$ | $R_1=+\ 30.0$<br>$R_2=+386.0$ | $t_1=5.00$ |
| II   | $N_D=1.575$<br>$V=41.4$ | $R_3=-\ 77.7$<br>$R_4=+\ 25.9$ | $S_1=5.52$<br>$t_2=3.72$ |
| III  | $N_D=1.637$<br>$V=56.1$ | $R_5=+\ 81.2$<br>$R_6=-\ 20.9$ | $S_2=6.88$<br>$t_3=7.99$ |
| IV   | $N_D=1.523$<br>$V=50.5$ | $R_7=-113.7$ | $t_4=2.00$ |

Fig. 2   f/3.5   F=100 mm.

| Lens | Glass | Radii | Spacings |
|------|-------|-------|----------|
|      |       | mm.   | mm.      |
| I    | $N_D=1.620$<br>$V=60.4$ | $R_1=+\ 27.5$<br>$R_2=+165.0$ | $t_1=6.63$ |
| II   | $N_D=1.605$<br>$V=38.2$ | $R_3=-117.0$<br>$R_4=+\ 24.9$ | $S_1=4.45$<br>$t_2=2.48$ |
| III  | $N_D=1.639$<br>$V=55.5$ | $R_5=+\ 73.5$<br>$R_6=-\ 27.2$ | $S_2=6.86$<br>$t_3=7.96$ |
| IV   | $N_D=1.523$<br>$V=58.4$ | $R_7=-120.1$ | $t_4=2.00$ |

These two examples serve to illustrate the invention and by reference to these examples, the following description will explain the pertinent portions of the theory underlying the invention. Although the rear component is the most important in connection with the present invention, the refractive surfaces will be considered in the order encountered by the incident light. The surfaces and their radii of curvature will be designated $R_1, R_2 \ldots R_7$, the thickness of the elements $t_1 \ldots t_4$ and the spacings $S_1$ and $S_2$ in the usual way and as shown in the drawing.

The front crown may be bent to control the flatness of field which is very sensitive in its response to such bending. In the preferred embodiment wherein this component is meniscus, the spherical aberration also responds to such bending. For a satisfactory field $R_1$ must be held between 23% and 35% F and $R_2$ according to its absolute value must be greater than F. It is possible for $R_2$ to be slightly less than F without departing from the present invention especially when the front component is made compound. It might conceivably also be possible to use a very low index glass in this component and have $R_1$ less than 23% F but such cases are undesirable. However, except for the added feature of having this component meniscus in the preferred embodiment, the present invention is not directly concerned with limitations regarding this front component except to the degree in which they define the class of objectives to which the invention belongs.

This latter statement is also true with regard to the dispersive element wherein the novel feature of the preferred embodiment is that $R_3 > F$. $R_4$ is held at about $\frac{1}{4}F$.

In an objective made according to the invention and working at f/3.5, $S_2$ must be made less than twice $S_1$, or the distortion (barrel type) will go beyond tolerance limits. In general $S_2$ will be greater than $S_1$, but this is not necessarily true since it is possible to have a lens according to the present invention in which $S_1$ is slightly the greater.

As shown in the drawing $R_5$ is between .7F and F, i. e. is less than F. This feature which is quite different from former lenses of this type is a relative one determined by the resulting power of the surface. For all ordinary crown glasses $R_5$ must be less than F but if a glass having an index of refraction $N_D > 1.8$ say, is used, $R_5$ may be slightly greater than F and still meet the requirment of being relatively strong. In such cases where $N_D$ is greater than 1.65, $R_5$ must be less than 2F (for all known glasses) and may be less than F.

Although $R_5$ according to the invention is relatively strong compared to $R_5$ in other lenses of this type, it is the outer surface of the crown element of the rear component and corresponds to $R_7$ of lenses wherein the crown element is placed to the rear. This $R_7$ in known lenses is usually strong being less than $\frac{1}{2}F$. Thus the invention has the added advantage of providing relatively weak outer surfaces on both sides of the rear component $R_5$ being greater than .6F and $R_7$ being in the examples shown greater than F (negative). It is even possible within the invention to make $R_7$ plano i. e. infinite. On the other hand it is possible to allow $R_7$ to be slightly less than F depending on the glasses used and the covering power desired and hence it is not easy to define the limits for $R_7$ except that it is always greater than $\frac{1}{2}F$.

The cemented surface $R_6$ concave to the incident light has been found to control the spherical aberration of the system and must be held at about $\frac{1}{4}F$ (negative)—i. e. between 15% and 35% F. It is curious to note that similar absolute limitations apply to known lenses in which this surface is positive.

Regarding the distribution of powers between the components, in Fig. 1 the focal lengths of the front, dispersive, and rear components are respectively 51, −32 and 56 mm. approximately and in Fig. 2 are respectively 50, −32 and 58 mm. approximately. Weakening these powers by changing the radii and/or the glass to say 52, −34 and 60 gives greater covering power but slightly less correction for astigmatism and other aberrations. To avoid lateral color and distortion, this balance of powers must be maintained and satisfactory results are impossible if too much power is shifted from the rear component to the front i. e. if the focal length of the rear component is weakened to say 75 (i. e. $\frac{3}{4}F$); it is preferably less than 65 (i. e. .65F). This is true of all lenses of this type working at an aperture of f/3.5 or larger as is the fact that the front component has usually about twice the power of the whole objective (i. e. its focal length is between .75F and .4F).

When a lens is made up according to the invention, the rear crown element must have a thickness $t_3$ greater than 4.5% F to permit an aperture of f/3.5 and practically this $t_3$ must be greater than 5% to give any useful thickness at the margins of the lens. In the examples shown $t_3$ is 8% F.

Having thus described two embodiments of the invention in detail, and the limitations some of which are necessary and some of which are incidental to the invention, we wish to point out that the invention is not limited to these specific structures but is of the scope of the appended claims.

We claim:

1. An objective comprising two collective components axially spaced on opposite sides of a dispersive component, the front collective component having about twice the power of the whole objective and the rear collective component having power at least one third greater than and less than three times that of the objective, the front surface of the front component and the rear surface of the dispersive component being convex to the incident light and having radii of curvature each equal to about one fourth of the focal length of the objective, the rear surface of the front component having a radius of curvature according to its absolute value greater than one half of the focal length of the objective, the front surface of the dispersive component being concave to the incident light with a radius of curvature greater than one half of the focal length of the objective, and the rear collective component being compound, said objective being characterized by the spacing between the rear component and the dispersive component being less than twice and more than three fourths the other spacing, the cemented surface of the rear component being concave to the incident light, the rear surface of the rear component having a radius of curvature greater than one half of the focal length of the objective and the front surface of the rear component being convex to the incident light with a radius of curvature between 60% of and twice the focal length of the objective for all glasses and less than this focal length when a crown glass having an index of refraction with respect to the D line less than 1.65 is used for this front element of this rear component.

2. An objective according to claim 1 in which the front component and the dispersive component are single elements.

3. An objective comprising two collective components axially spaced on opposite sides of a dispersive component, the front collective component having about twice the power of the whole objective and the rear collective component having power at least one third greater than and less than three times that of the objective, the front surface of the front component and the rear surface of the dispersive component being convex to the incident light and having radii of curvature each equal to about one fourth of the focal length of the objective, the rear surface of the front component having a radius of curvature according to its absolute value greater than one half of the focal length of the objective, the front surface of the dispersive component being concave to the incident light with a radius of curvature greater than one half of the focal length of the objective, and the rear collective component being compound, said objective being characterized by the spacing between the rear component and the dispersive component being less than twice and more than once the other spacing, the cemented surface of the rear component being concave to the incident light with a radius of curvature between 15% and 35% of the focal length of the objective, the rear surface of the rear component having a radius of curvature greater than said focal length, the front surface of the rear component being convex to the incident light with a radius of curvature between 70% and 100% of said focal length and the front element of this rear component having a thickness between 4.5% and 12% of the focal length.

4. An objective comprising two collective components axially spaced on opposite sides of a dispersive component, the front collective component having about twice the power of the whole objective and the rear collective component having power at least one third greater than and less than three times that of the objective, the front surface of the front component and the rear surface of the dispersive component being convex to the incident light and having radii of curvature each equal to about one fourth of the focal length of the objective, the rear surface of the front component having a radius of curvature according to its absolute value greater than one half of the focal length of the objective, the front surface of the dispersive component being concave to the incident light with a radius of curvature greater than one half of the focal length of the objective, and the rear collective component being compound, said objective being characterized by the spacing between the rear component and the dispersive component being less than twice and more than three fourths the other spacing, the cemented surface of the rear component being concave to the incident light; each outer surface of the rear component having a radius of curvature greater than one half of the focal length of the objective and the front component of the objective being meniscus with a radius of curvature for its rear surface less than ten times the focal length of the objective.

5. An objective comprising two collective components axially spaced on opposite sides of a dispersive component, the front collective component having about twice the power of the whole objective and the rear collective component having power at least one third greater than and less than three times that of the objective, the front surface of the front component and the rear surface of the dispersive component being convex to the incident light and having radii of curvature each equal to about one fourth of the focal length of the objective, the rear surface of the front component having a radius of curvature according to its absolute value greater than one half of the focal length of the objective, the front surface of the dispersive component being concave to the incident light with a radius of curvature greater than one half of the focal length of the objective, and the rear collective component being compound, said objective being characterized by the spacing between the rear component and the dispersive component being less than twice and more than three fourths the other spacing, the cemented surface of the rear component being concave to the incident light and the front surface of the dispersive component having a radius of curvature greater than the focal length of the objective.

FRED E. ALTMAN.
GEORGE H. AKLIN.